United States Patent [19]
Gessler, II et al.

[11] Patent Number: 5,302,177
[45] Date of Patent: Apr. 12, 1994

[54] TIN FLOAT BATH FOR MANUFACTURING SHEET GLASS UTILIZING RECUPERATIVE GAS BURNERS

[76] Inventors: Herbert A. Gessler, II, 439 Church Hill Rd, Venetia, Pa. 15367; Herbert A. Gessler, 101 Lexington Dr., Lawrence, Pa. 15055; Matthew A. Gessler, 252 Papp Rd., Canonsburg, Pa. 15317

[21] Appl. No.: 920,399

[22] Filed: Jul. 27, 1992

[51] Int. Cl.⁵ .......................................... C03B 18/18
[52] U.S. Cl. .................... 65/162; 65/182.3; 65/99.3; 65/182.1; 236/15 BE
[58] Field of Search ...... 65/99.2, 99.3, 99.4, 65/99.5, 182.3, 182.4, 182.5, 160, 162, DIG. 13; 264/298; 236/15 BE, 15 BD, 1 A; 431/18

[56] References Cited

U.S. PATENT DOCUMENTS

| | | | |
|---|---|---|---|
| 1,564,240 | 12/1925 | Hitchcock | 65/182.3 |
| 1,864,087 | 6/1932 | Mooman . | |
| 2,004,916 | 6/1935 | Fitch . | |
| 3,083,551 | 4/1963 | Pilkington | 65/32.5 |
| 3,332,763 | 7/1967 | Basler et al. | 65/32.5 |
| 3,486,869 | 12/1969 | Alonzo et al. | 65/27 |
| 3,633,886 | 1/1972 | Froberg . | |
| 4,497,628 | 2/1985 | Blanchet et al. . | |
| 4,622,059 | 11/1986 | Brown | 65/160 |
| 4,752,212 | 6/1988 | Breen | 431/215 |

OTHER PUBLICATIONS

Handbook of Glass Manufacture, vol. II, 3rd Edition, pp. 714-712 thru 714-721.
The Glass Industry Magazine, 1980 April Issue; pp. 18, 20, 22; Article "Float Glass Production: Pilkington vs PPG", by Ronald a McCauley, Rutgers University.
A Review Lecture, "The Float Glass Process," by L. A. B. Pilkington, Delivered Feb. 13, 1949.

Primary Examiner—W. Gary Jones
Assistant Examiner—Steven P. Griffin
Attorney, Agent, or Firm—William J. Ruano

[57] ABSTRACT

In the tin float bath process of flat glass production, proposed automatic recuperative natural gas burners will replace the existing electrical heating elements. The use of natural gas instead of electricity creates a more energy-efficient bath operation, amounting to an approximately seventy percent savings. Control of the burner zones is comparable to that utilized with the replaced electrically heated zones. Combustion air and natural gas are ignited and burned within a heat-radiating chamber. The residue from burnt gases is exhausted externally to the bath and has no contact whatever with the atmosphere inside the bath. Advantages comprise a less complicated installation with minimal maintenance and with little or no replacement parts, all of which contribute to longevity not attained by prior art. Additionally, shutdown of the process is not necessary to remove and replace a possible defective burner, as is required with defective electrical heaters. Only periodic visual inspection is required. Auxiliary burners presently used to preheat the bath are unnecessary prior to the flow of molten glass from the melting tank. The proposed burners will fulfill this function before continuing with the process heating to the point required for maintaining the temperature profile of the tin float bath.

1 Claim, 9 Drawing Sheets

| HEATING CONVERSION CHART ||||||||||
|---|---|---|---|---|---|---|---|---|---|
| EXIS ELEC HEAT'G ELEMENTS |||| PROPOSED GAS BURNERS ||||||
| ZONE | CONN KW | QTY | BTU'S | ZONE | BTU'S | QTY | LENGTH | DIS RATE | BURNER BTU'S | TOTAL BTU'S |
| 1' | 75 | 20 | 255900 | 1 | 639750 | 7 | 72 | 90 | 132000 | 924000 |
| 2' | 71.25 | 19 | 243105 | | | | | | | |
| 3' | 82.5 | 22 | 281490 | | | | | | | |
| 4' | 71.25 | 19 | 243105 | 2 | 639750 | 7 | 72 | 90 | 132000 | 924000 |
| 5' | 75 | 20 | 255900 | | | | | | | |
| 6' | 75 | 20 | 255900 | 3 | 511800 | 6 | 72 | 84 | 122000 | 732000 |
| 7' | 75 | 20 | 255900 | | | | | | | |
| 8' | 75 | 20 | 255900 | 4 | 511800 | 6 | 72 | 84 | 122000 | 732000 |
| 9' | 75 | 20 | 255900 | | | | | | | |
| 10' | 75 | 20 | 255900 | 5 | 511800 | 6 | 72 | 84 | 122000 | 732000 |
| 11' | 75 | 20 | 255900 | | | | | | | |
| 12' | 75 | 20 | 255900 | 6 | 511800 | 6 | 72 | 84 | 122000 | 732000 |
| 13' | 75 | 20 | 255900 | | | | | | | |
| 14' | 75 | 20 | 255900 | 7 | 255900 | 4 | 42 | 110 | 92000 | 368000 |
| 15' | 75 | 20 | 255900 | 8 | 255900 | 4 | 42 | 110 | 92000 | 368000 |
| 16' | 75 | 20 | 255900 | 9 | 255900 | 4 | 42 | 110 | 92000 | 368000 |
| 17' | 75 | 20 | 255900 | 10 | 255900 | 4 | 42 | 110 | 92000 | 368000 |
| 18' | 75 | 20 | 255900 | 11 | 255900 | 4 | 42 | 110 | 92000 | 368000 |
| 19' | 75 | 20 | 255900 | 12 | 255900 | 4 | 42 | 110 | 92000 | 368000 |
| 20' | 75 | 20 | 255900 | 13 | 255900 | 4 | 42 | 110 | 92000 | 368000 |
| 21' | 75 | 20 | 255900 | 14 | 255900 | 4 | 42 | 110 | 92000 | 368000 |
| 22' | 75 | 20 | 255900 | 15 | 255900 | 4 | 42 | 110 | 92000 | 368000 |
| 23' | 75 | 20 | 255900 | 16 | 255900 | 4 | 42 | 110 | 92000 | 368000 |
| 24' | 75 | 20 | 255900 | 17 | 255900 | 4 | 42 | 110 | 92000 | 368000 |
| 25' | 75 | 20 | 255900 | 18 | 255900 | 4 | 42 | 110 | 92000 | 368000 |
| 26' | 75 | 20 | 255900 | 19 | 255900 | 4 | 42 | 110 | 92000 | 368000 |
| 27' | 75 | 20 | 255900 | 20 | 255900 | 4 | 42 | 110 | 92000 | 368000 |
| 28' | 75 | 20 | 255900 | 21 | 255900 | 4 | 42 | 110 | 92000 | 368000 |
| 29' | 75 | 20 | 255900 | 22 | 255900 | 4 | 42 | 110 | 92000 | 368000 |
| 30' | 175 | 47 | 597000 | 23 | 853000 | 8 | 72 | 105 | 153000 | 1224000 |
| 31' | 150 | 40 | 512000 | | | | | | | |
| 32' | 175 | 47 | 597000 | 24 | 853000 | 8 | 72 | 105 | 153000 | 1224000 |
| TOTALS | 2675 | 714 | 9,127,100 | | | 118 | | | | 13,112,000 |

FIGURE 9

BATH OPERATION
COST COMPARISON CHART

| ELECTRICITY | NATURAL GAS |
|---|---|
| TOTAL CONNECTED LOAD - 2675KW<br>TOTAL ELECTRICAL USAGE - 2675KWH (@ 100%)<br>- 2675KWH x 8766HRS = 23,449,050KWH / YR<br>- 23,449,050KWH x $0.0515/KWH = $1,207,626.00<br><br>TOTAL ANNUAL ELECTRICAL COST = $1,207,626.00 | TOTAL QUANTITY OF BURNERS - 118<br>TOTAL NATURAL GAS USAGE - 64 x 0.092MCF / HR = 5.9MCF / HR (ZONES 14 - 29)<br>- 14 x 0.132MCF / HR = 1.8MCF / HR (ZONES 1 - 2)<br>- 24 x 0.122MCF / HR = 2.9MCF / HR (ZONES 3 - 6)<br>- 16 x 0.153MCF / HR = 2.4MCF / HR (ZONES 30 - 31)<br>- 13.0MCF x 8766HRS = 113,958MCF / YR<br>- 113,958MCF x $3.50/MCF = $398,853.00<br><br>TOTAL ANNUAL NATURAL GAS COST = $398,853.00 |

TOTAL ANNUAL ELECTRICAL COST = $1,207,626.00
TOTAL ANNUAL NATURAL GAS COST = $ 398,853.00
TOTAL ANNUAL ENERGY SAVINGS    = $ 808,773.00

FIGURE 10

| ELECTRICAL EQUIPMENT NO LONGER REQUIRED ||||||||| 
| PRIMARY SIDE |||| SECONDARY SIDE |||||
| ZONE | PWR BUS DUCT (REMOTE) | DISC SWITCH (REMOTE) | CONTACTOR & REACTOR (REMOTE) | TRANS- FORMER 1"~32" | BUS BARS (TOTAL) 35 | BUS BOXES 36 | CONNEC TORS 37 | CABLES 38 | HEATING ELEMENTS 39 |
|---|---|---|---|---|---|---|---|---|---|
| 1' | 5 FT | 1 | 1 SET | 1 | 36 FT | 1 | 132 | 356 FT | 20 |
| 2' | 5 FT | 1 | 1 SET | 1 | 60 FT | 1 | 126 | 394 FT | 19 |
| 3' | 5 FT | 1 | 1 SET | 1 | 81 FT | 1 | 144 | 472 FT | 22 |
| 4' | 5 FT | 1 | 1 SET | 1 | 60 FT | 1 | 126 | 356 FT | 19 |
| 5' | 5 FT | 1 | 1 SET | 1 | 36 FT | 1 | 132 | 394 FT | 20 |
| 6' | 5 FT | 1 | 1 SET | 1 | 36 FT | 1 | 132 | 458 FT | 20 |
| 7' | 5 FT | 1 | 1 SET | 1 | 60 FT | 1 | 132 | 512 FT | 20 |
| 8' | 5 FT | 1 | 1 SET | 1 | 60 FT | 1 | 132 | 356 FT | 20 |
| 9' | 5 FT | 1 | 1 SET | 1 | 36 FT | 1 | 132 | 416 FT | 20 |
| 10' | 5 FT | 1 | 1 SET | 1 | 36 FT | 1 | 132 | 494 FT | 20 |
| 11' | 5 FT | 1 | 1 SET | 1 | 60 FT | 1 | 132 | 536 FT | 20 |
| 12' | 5 FT | 1 | 1 SET | 1 | 60 FT | 1 | 132 | 440 FT | 20 |
| 13' | 5 FT | 1 | 1 SET | 1 | 36 FT | 1 | 132 | 500 FT | 20 |
| 14' | 5 FT | 1 | 1 SET | 1 | 36 FT | 1 | 132 | 506 FT | 20 |
| 15' | 5 FT | 1 | 1 SET | 1 | 36 FT | 1 | 132 | 464 FT | 20 |
| 16' | 5 FT | 1 | 1 SET | 1 | 36 FT | 1 | 132 | 440 FT | 20 |
| 17' | 5 FT | 1 | 1 SET | 1 | 36 FT | 1 | 132 | 410 FT | 20 |
| 18' | 5 FT | 1 | 1 SET | 1 | 36 FT | 1 | 132 | 392 FT | 20 |
| 19' | 5 FT | 1 | 1 SET | 1 | 36 FT | 1 | 132 | 356 FT | 20 |
| 20' | 5 FT | 1 | 1 SET | 1 | 36 FT | 1 | 132 | 380 FT | 20 |
| 21' | 5 FT | 1 | 1 SET | 1 | 36 FT | 1 | 132 | 344 FT | 20 |
| 22' | 5 FT | 1 | 1 SET | 1 | 36 FT | 1 | 132 | 362 FT | 20 |
| 23' | 5 FT | 1 | 1 SET | 1 | 36 FT | 1 | 132 | 362 FT | 20 |
| 24' | 5 FT | 1 | 1 SET | 1 | 36 FT | 1 | 132 | 320 FT | 20 |
| 25' | 5 FT | 1 | 1 SET | 1 | 36 FT | 1 | 132 | 320 FT | 20 |
| 26' | 5 FT | 1 | 1 SET | 1 | 36 FT | 1 | 132 | 344 FT | 20 |
| 27' | 5 FT | 1 | 1 SET | 1 | 36 FT | 1 | 132 | 344 FT | 20 |
| 28' | 5 FT | 1 | 1 SET | 1 | 36 FT | 1 | 132 | 320 FT | 20 |
| 29' | 10 FT | 1 | 1 SET | 1 | 36 FT | 1 | 132 | 320 FT | 20 |
| 30' | 10 FT | 1 | 1 SET | 1 | 72 FT | 1 | 318 | 800 FT | 47 |
| 31' | 10 FT | 1 | 1 SET | 1 | 114 FT | 1 | 276 | 760 FT | 40 |
| 32' | 10 FT | 1 | 1 SET | 1 | 72 FT | 1 | 318 | 800 FT | 47 |
| TOTALS | 180 FT | 32 | 32 SETS | 32 | 1,491 FT | 32 | 4,740 | 14,028 FT | 714 |

FIGURE 11

TIN FLOAT BATH FOR MANUFACTURING SHEET GLASS UTILIZING RECUPERATIVE GAS BURNERS

BACKGROUND OF THE INVENTION

1. Field of the Invention

This invention relates generally to the controlled cooling of the molten flat glass ribbon as it passes through the tin float bath at a continuous rate. Manufacturing flat glass comprises the delivering of molten glass to a bath of molten tin and advancing the glass along the surface of the tin bath under thermal conditions that do not contaminate the internal atmosphere. Such contamination is detrimental to both the glass product and the molten tin. Glass at approximately 1900 degrees F enters the bath from the melting tank and at approximately 1200 degrees F exits the bath to a cooling lehr. In present installations the temperatures in the bath are maintained with electrical resistance heaters suspended from the roof over the flat ribbon of glass. Such electrical heaters do not contaminate the bath atmosphere and have been used over the past twenty year period.

2. Description of the Related Art

Attempts to burn natural gas over the bath by the glass industry failed the industry's contamination requirements. This invention originates a unique application of the automatic recuperative natural gas burners to flat glass production for the first time. Combustion air and natural gas are ignited and burned within a heat-radiating chamber. The residue from burnt gases is exhausted externally to the bath and has no contact whatever with the atmosphere inside the bath. Recuperative burners have been used previously by the steel and aluminum industries, but never in the tin float bath process by the glass industry.

PRIOR ART

| Patents | | |
|---|---|---|
| Number | Date | Relationship |
| 3,083,551 | 04.02.63 | Layout of float bath with molten metal |
| 3,332,763 | 07.25.67 | Layout of tin float bath utilizing electrical heating elements |
| 3,486,869 | 12.30.69 | Layout of tin float bath utilizing regular and auxiliary electrical heating elements |

Reference Material (To assist in understanding the presentation)

The Handbook of Glass Manufacture, volume II, 3rd edition, pages 714-2 through 714-21, copy enclosed.
The Glass Industry Magazine, April 1980 issue, pages 18,20,22, article "Float Glass Production: Pilkington vs PPG," by Ronald A. McCauley, Rutgers University, copy enclosed.
A Review Lecture, "The float glass process," by L. A. B. Pilkington, delivered Feb. 13, 1949, copy enclosed.
Reference Drawings, sheet 1 with FIGS. 1 and 2 and sheet 2 with FIG. 3 showing the existing electrical tin float bath.

Prior art uses electrical heating elements with intricate power supplies, conductors, contactors and controls. The present invention's use of a natural gas system with automatic recuperative burners surpasses the prior art by being more cost-efficient and more energy-efficient, does not contaminate the bath atmosphere, is more easily installed, minimizes maintenance and shutdown, all of which promotes increased productivity.

SUMMARY OF THE INVENTION

Replacement of the electrical heating elements with automatic recuperative natural gas burners in the bath process will result in the following operational cost advantages. The utilization of natural gas is more energy-efficient than electricity, approximately a conservative seventy percent savings in this case. The gas burner installation encompasses few moving parts, easy insertion of the burners through the mounting flange even during full operation, only two piping connections for gas and combustion air, and simple HIGH-FIRE, LOW-FIRE, OFF control. Glass production is a twenty-four hour daily operation throughout the mechanical life of the bath. Burned out or broken electrical heaters periodically cause operational adjustments to maintain glass flow until quality is affected and complete shutdown then becomes necessary. Shutdown coats are prohibitive, thousands of dollars per minute. Shutdown entails stopping the glass flow, cooling the bath, raising the roof, replacing the failed electrical heaters with new, reconnection, lowering the roof, reheating the bath and again establishing the glass flow in its proper atmosphere.

This shutdown encompasses engineering, demolition and installation for a ninety day period during which no glass is produced. With the automatic recuperative gas burners no shutdown is necessary. Seldom will the gas burners fail. If one does require replacement, it can be readily removed and replaced. This replacement will take approximately six hours, during which time the glass flows continuously with no interruptions. The longevity of the installation is made possible because the burners are capable of withstanding the corrosive nature of tin sulfide/tin present in the bath atmosphere and will not deteriorate.

BRIEF DESCRIPTION OF DRAWINGS

FIG. 8 is typical of all zones having four burners. Zones with six, seven or eight burners are provided similarly and from the same gas and air headers. See FIG. 9 for the quantity of burners per zone.

FIG. 9 is a heating conversion chart showing the connected kilowatts, the quantity of the present electrical heating elements, the total rated BTU's for each of the existing thirty-two electrical zones of the existing tin float bath, the proposed burner zone BTU requirements, the quantity of burners per burner zone, burner information and total BTU's for each of the twenty-four gas burner zones. This chart presents the calculated requirements to operate the altered tin float bath and to determine how cost efficient and energy efficient the altered bath becomes. See FIG. 10 for comparative costs.

FIG. 10 is a bath operation cost comparison chart presenting both the total annual cost of operating an existing bath with electricity and the converted bath with natural gas.

FIG. 11 is a chart showing the quantities of the electrical equipment and materials to be removed from the existing tin float bath in preparation for the installation of the new automatic recuperative gas burners.

DESCRIPTION OF THE PREFERRED EMBODIMENTS

Figure 1:
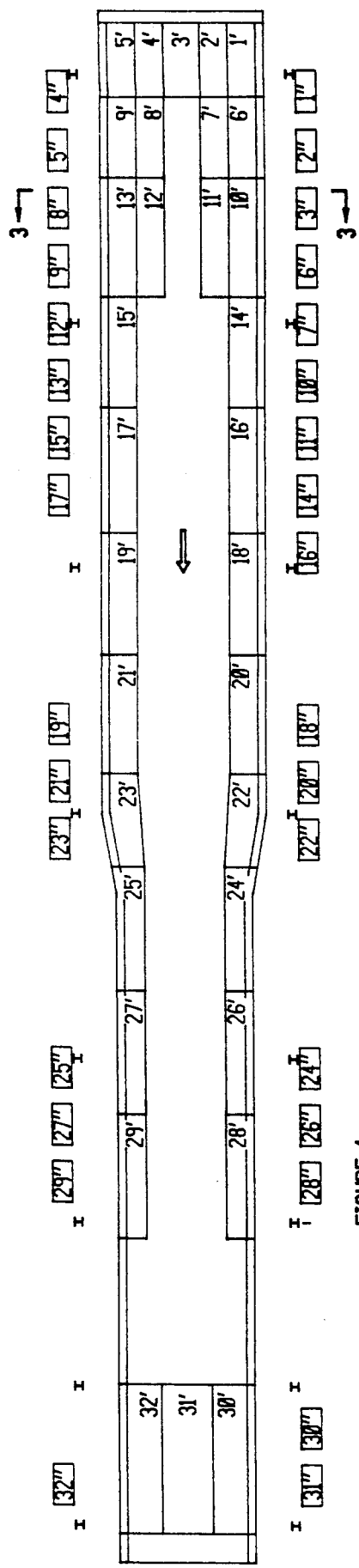
FIG. 1 is a plan view of an existing tin float bath showing heating zones and electrical heating transformers.
Figure 2:
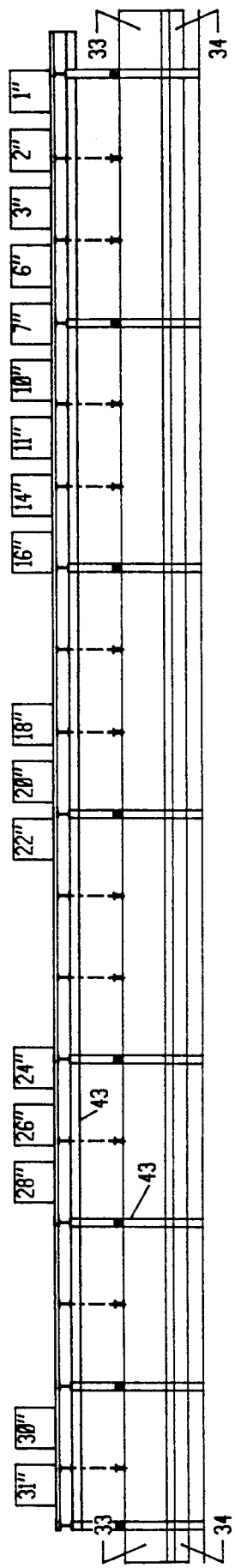
FIG. 2 is a longitudinal elevation of an existing tin float bath showing the bath roof and the bath bottom and the heating transformers mounted on the roof support structure.
Figure 3:
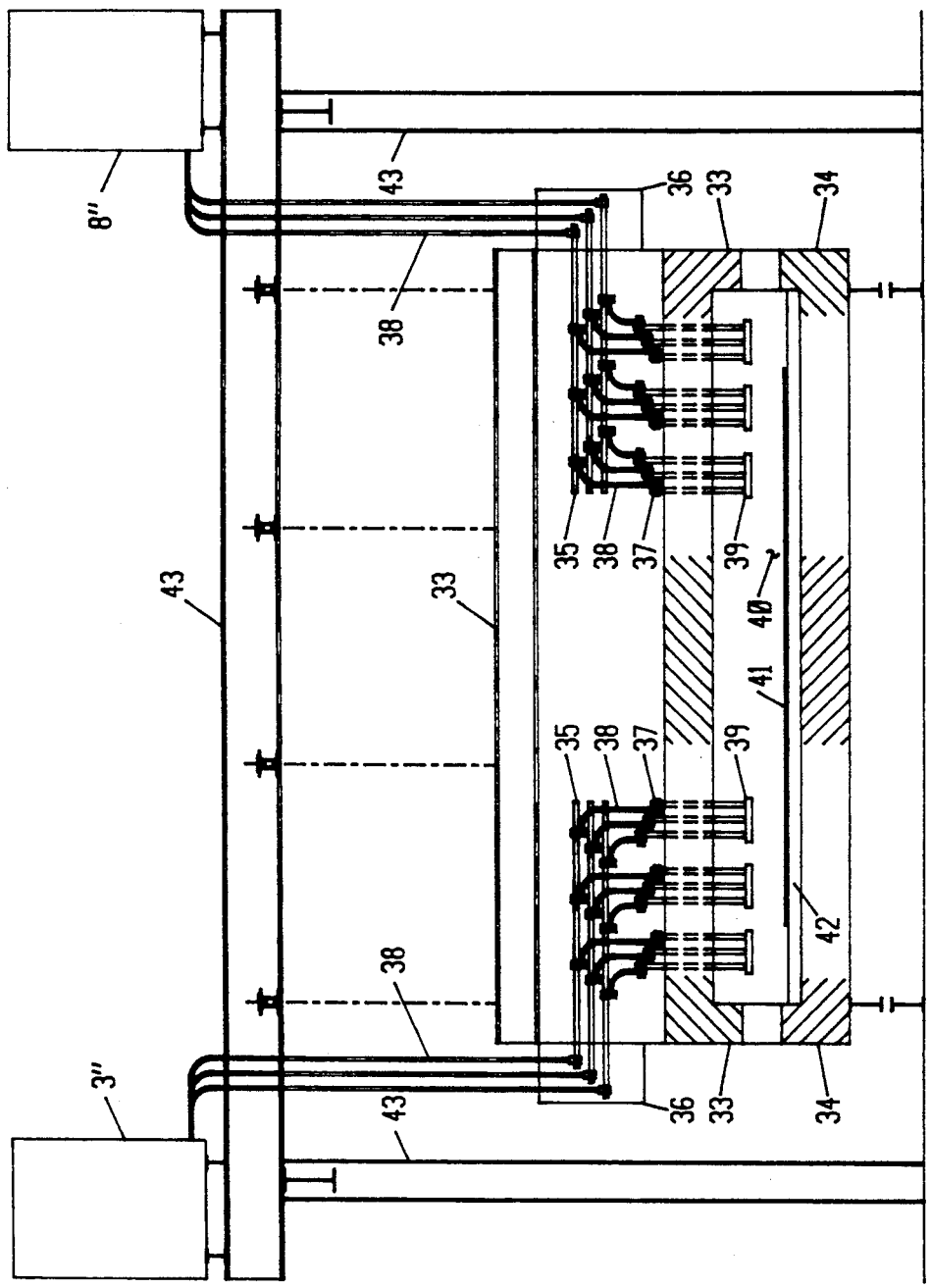
FIG. 3 is a transverse section of an existing tin float bath taken at the plan line 3—3 of FIG. 1 detailing the electrical materials and equipment. This section is typical throughout the length of the present bath.

An explanation of the existing tin float bath must precede the detailed presentation of the invention. In order that the present invention may be understood more readily, references to the accompanying figures will be made. FIG. 1 is a plan view of a typical tin float bath with electrical heating zones numbered 1' through 32' and with the associated zone transformers numbered 1" through 32". Glass enters the bath from the right and exits from the left. FIG. 2 is a longitudinal elevation of the existing bath showing the bath roof 33, the bath bottom 34 and the heating transformer locations above. FIG. 3 is a transverse section taken on the line 3—3 of FIG. 1, detailing the electrical materials internal to the bath roof and consisting of copper bus bars 35 terminating in the bus box 36 and connectors 37. Cables 38 connect bus bars 35 to the heating elements 39 and to the transformers 3" and 8". FIG. 3 is typical throughout the length of the bath. Electrical resistance heaters 39 are shown extended into the bath atmosphere 40 over the glass ribbon 41 floating on the tin 42. The bath roof 33 is supported separately from the bath bottom 34 by a structural framework 43.

Figure 4:
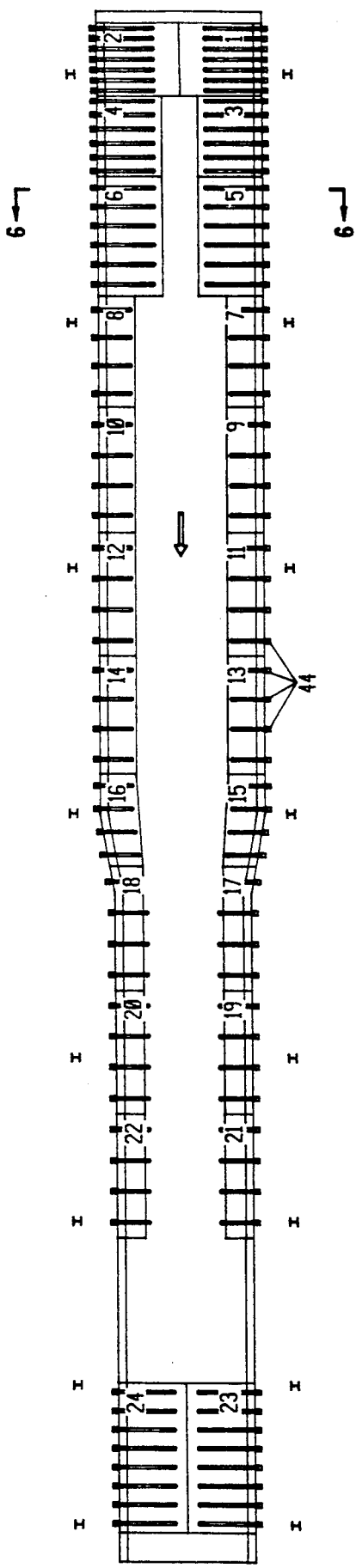
FIG. 4 is a plan view of the altered tin float bath showing how the electrical installation of FIG. 1 has been removed and replaced with natural gas burners.
Figure 5:
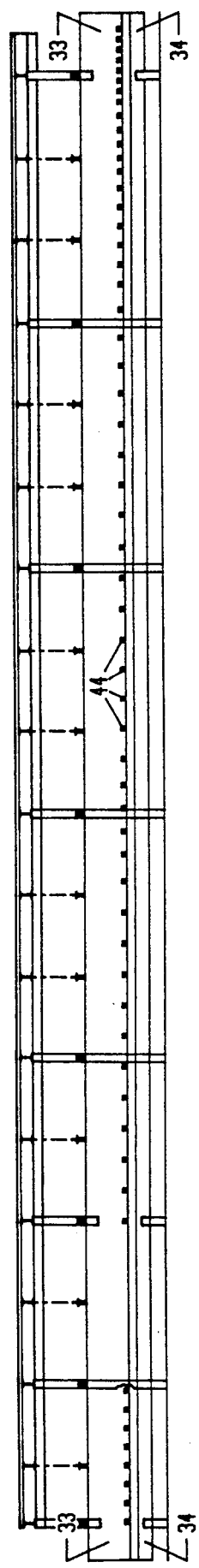
FIG. 5 is a longitudinal elevation of the altered tin float bath showing the side-mounted natural gas burners.
Figure 6:
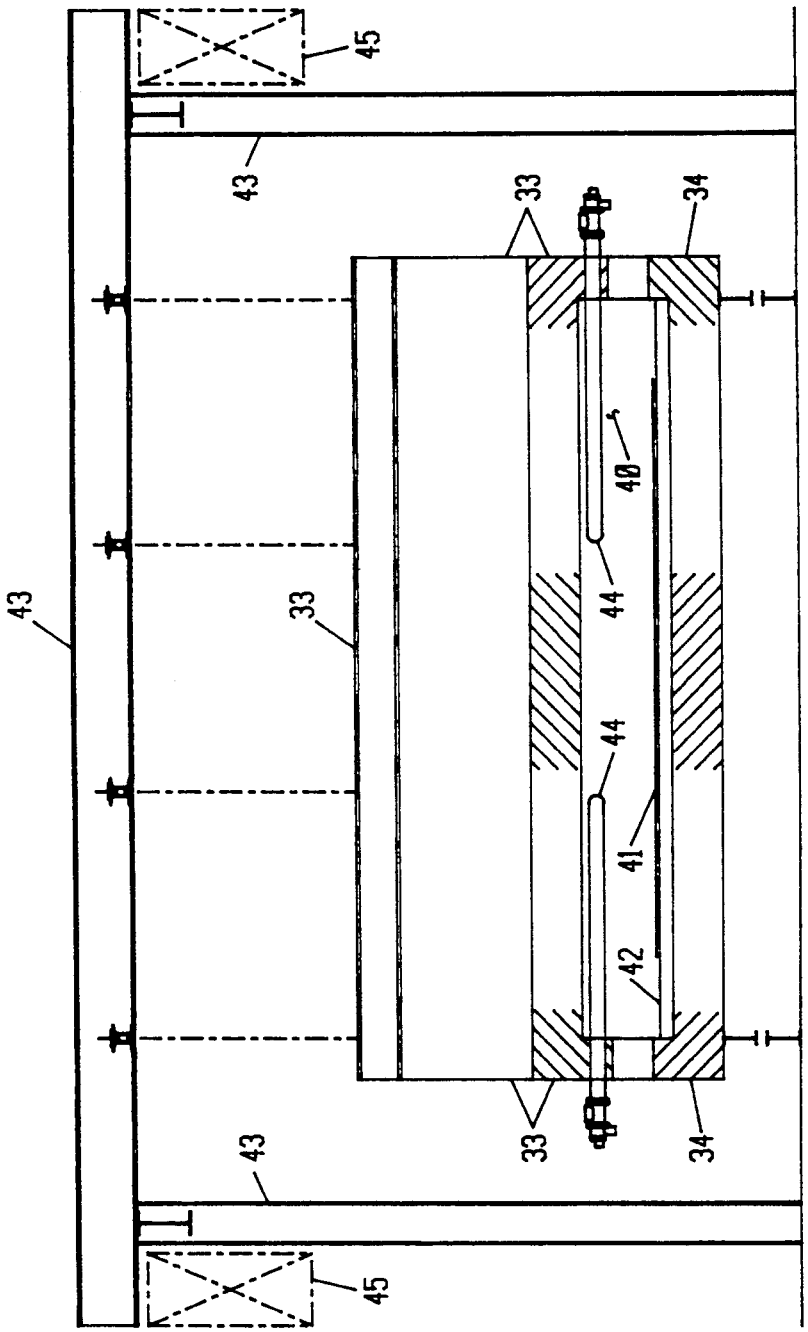
FIG. 6 is a transverse section of the altered tin float bath taken at the plan line 6—6 of FIG. 4 showing the absence of the electrical heating materials and equipment and their replacement with the side-mounted natural gas burners. This section is typical throughout the length of the altered bath.
Figure 7:
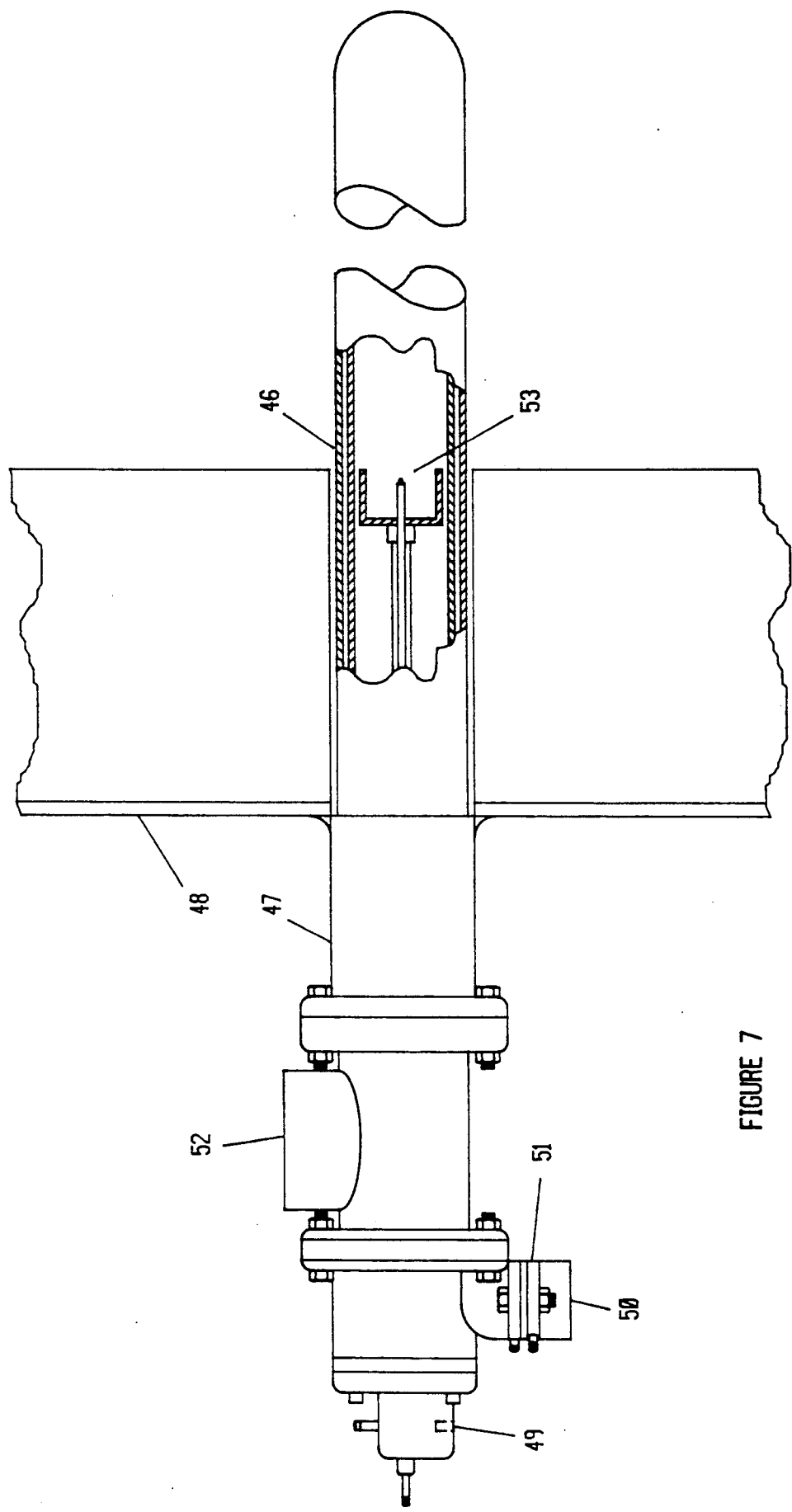
FIG. 7 is a detailed cutaway view of the automatic recuperative natural gas burner.

To prepare the bath roof 33 for the installation of the new natural gas burners 44 (FIGS. 4 and 5) it becomes necessary to remove certain electrical items as shown on FIGS. 1, 2 and 3. These items comprise heating transformers 1" through 32", bus bars 35, bus boxes 36, connectors 37, cables 38 and electrical resistance heaters 39 throughout the length of the bath. See quantities in FIG. 11. FIG. 4 is a plan view of the altered tin float bath showing the locations of one hundred eighteen natural gas burners 44 in their respective heating zones. Glass enters the bath from the right and exits from the left. FIG. 5 is a longitudinal elevation of the altered tin float bath showing transformer removal and the locations of the natural gas burners 44 mounted through the side walls of the bath roof 33. FIG. 6 is a transverse section taken along the line 6—6 of FIG. 4 showing the bath roof 33 emptied of the electrical materials and with the side-mounted natural gas burners 44 installed. Space 45 is allocated for both natural gas and combustion air header pipes. FIG. 7 is a cutaway view of the automatic recuperative natural gas burner similar to that as fabricated with Kanthal APM by Eclipse Combustion of Rockford, Ill. Each burner consists of an ignition and heat-radiating chamber 46 for operation up to 2370 degrees F., a flanged mount 47 welded to the external bath steel shell 48, complete with gas inlet 49, air inlet 50, air metering orifice 51, an exhaust outlet 52 and the internals with a burner nozzle 53. This particular burner type is capable of withstanding the corrosive nature of tin sulfide/tin present in the bath atmosphere.

Figure 8:
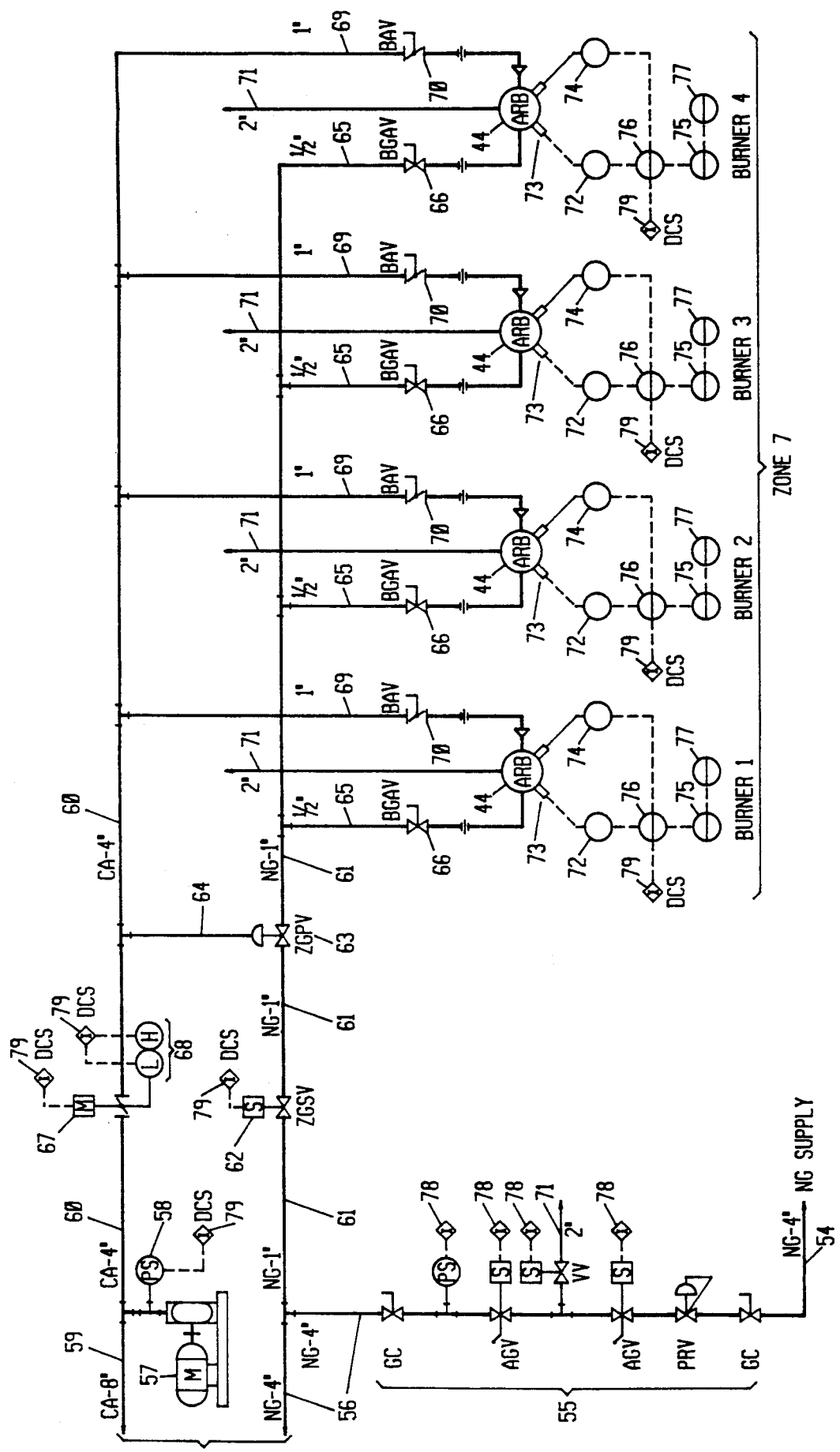
FIG. 8 is a piping and instrumentation diagram showing the natural gas supply pipe with its main gas valve train, the natural gas header pipe, the combustion air blower, the combustion air header pipe, associated valves, and with requisite taps, adjustable valves, burners and instruments.

The preceding paragraph refers primarily to the preparation of the altered bath. The remaining equipment, instruments, piping and valves will be shown on FIG. 8, a typical piping and instrumentation diagram. The explanation of FIG. 8 will describe the operation. A four burner zone 7 is shown. Zones with six, seven and eight burners are similar, differing only in the quantity of burners. Two blowers, the main gas supply with valve train, the control valves and instruments provide combustion air and gas to the gas burners on both sides of the bath.

Natural gas is provided via a 4" gas line 54 to the main gas valve train 55, consisting of: two manual shut-off valves, a pressure regulating valve, two electrically-operated, manually-reset shut-off valves with electrical interlocks, a vent valve with an electrical interlock and pressure switch with an electrical interlock. All electrical interlocks 78 are connected to the ignition section of the burner control panel. The four inch natural gas line 56 continues from the main gas valve train as the main gas supply header running along total bath length in allocated space 45, FIG. 6.

Combustion air is provided by a centrifugal blower 57 via an eight inch main air supply header 59. A pressure switch 58 with an electrical interlock 79 is utilized to sense correct air header pressure. This eight inch main air supply header 59 continues along total bath length in allocated space 45, FIG. 6.

The four inch main gas supply header 56 along both sides of the length of the bath is tapped at each burner zone location to form a one inch secondary gas header 61. Located at the beginning of the one inch secondary gas header are two valves. The first is the burner zone secondary gas header ON-OFF solenoid valve 62 with an electrical interlock 79. The second is the burner zone secondary gas header proportionator valve 63 with a proportionator impulse line 64 tapped into the secondary air supply header 60. This proportionator valve is required to maintain the proper natural gas to air ratio required for combustion within the automatic recuperative burner 44. The one inch secondary gas header 61 is continued from the proportionator valve and is tapped with a half inch line 65 connected to the zone automatic recuperative burner 44. This line is provided with an adjustable valve 66.

The eight inch main air supply header 59 along both sides of the length of the bath is tapped at each burner zone location to provide a four inch secondary air supply header 60. Located at the beginning of the four inch secondary air supply header is an electrically-operated motor-driven valve 67, which regulates the combustion air flow. The motor-driven valve 67 is provided with a two-position switch 68 which indicate LOW-FIRE or HIGH-FIRE conditions. Both the motor-driven valve and the two-position switch have electrical interlocks 79. The four inch secondary air supply header 60 is continued from the motor-driven valve 67 and is tapped with a one inch air line 69 connected to the zone automatic recuperative burner 44. This line is provided with an adjustable shut-off valve 70.

In addition, the automatic recuperative burner 44 is provided with a two inch exhaust stack 71 to atmosphere. Each automatic recuperative burner is furnished with an ignition system. This system comprises an ignition transformer 72, ignition plug 73 and an ultraviolet flame detector 74. Associated with this system are a timer 75, a relay 76 and an indicating light 77 mounted in the ignition section of the burner control panel. Each zone burner has its respective interlock 79. All interlocks 79 are part of the DCS, Distributive Control System. In each burner 44 combustion air and natural gas are ignited and burned within the heat-radiating chamber 46. The residue from the burnt gases is exhausted externally to the bath and has no contact with the atmosphere inside the bath. As the burnt gases move through the chamber to the exhaust outlet 52, they preheat the incoming gas and air for a more efficient operation.

One burner control panel for the control of both sides of the bath has three functional sections: main valve train control, the burner ignition control and flame monitoring control. The operational status of all burners is indicated at this panel. If one burner fails to ignite, or fails to continue operating, the operating personnel knows immediately the condition and location of that particular burner and will initiate the corrective procedures.

We claim:

1. An apparatus for manufacturing sheet glass comprising a molten tin float bath which supports a molten glass ribbon, a bottom supporting said molten tin float bath, a pair of sidewalls connected to said bottom, one said sidewall on each side of and extending above said molten tin float bath and said molten glass ribbon, a top extending between and connecting said sidewalls above said molten tin float bath and said molten glass ribbon;

a plurality of recuperative gas burners mounted on each of said sidewalls with each said recuperative gas burner mounted in a parallel spaced relationship to adjacent burners;

each said recuperative gas burner having a heat-radiating chamber extending from said sidewalls and overlying said molten tin float bath and said molten glass ribbon and having a nozzle for producing a gas flame in said heat-radiating chamber, and each said recuperative gas burner including a gas inlet for supplying gas to said burner nozzle in said heat-radiating chamber, an air inlet for supplying gas to said burner nozzle in said heat-radiating chamber, an exhaust outlet for exhausting burnt gas from said heat-radiating chamber, and a flange mount for mounting said recuperative gas burner to said sidewall;

said recuperative gas burners being mounted in said sidewalls utilizing said flange mount, with said gas inlet, said air inlet, and said exhaust outlet located on a side of said sidewall opposite said molten tin float bath and said molten glass ribbon so that gas and air entering said heat-radiating chamber are ignited and burned and said burnt gas is exhausted from said heat radiating chamber externally to said molten float bath and said molten glass ribbon preventing contamination of said molten float bath and said molten glass ribbon;

and a burner control panel for controlling said recuperative gas burners including a main valve train control, a burner ignition control, and a flame monitoring control.

* * * * *